Oct. 29, 1935.  J. A. MAURER, JR  2,019,152
SOUND REPRODUCER AND OPTICAL SYSTEM THEREFOR
Filed March 17, 1931

INVENTOR
J. A. MAURER, JR.
BY
ATTORNEY

Patented Oct. 29, 1935

2,019,152

UNITED STATES PATENT OFFICE 2,019,152

SOUND REPRODUCER AND OPTICAL SYSTEM THEREFOR

John A. Maurer, Jr., New York, N. Y., assignor to Radio Corporation of America, a corporation of Delaware Application March 17, 1931, Serial No. 523,284

3 Claims. (Cl. 179—100.31)

Sound reproducers and recorders of the sound-on-film type ordinarily comprise an optical system which serves to form a linear image of a light source on the film sound record at an operational point past which the film is translated at a uniform speed and from which the light passes to a photo-electric cell in the case of a sound reproducer. Such optical systems have heretofore been complicated and extensive and particularly have been extremely difficult to adjust and maintain in adjustment.

A further disadvantage of many such systems and particularly those employing a microscope objective as a final element for producing a linear image on the film has been that the relative aperture of this final objective was much less than might be desired and as a consequence the light intensity or slit width at the entrance end of the optical system was necessarily kept undesirably large with attendant disadvantages as to sound quality, heating of the apparatus and so forth.

The present invention relates to an improvement in such optical systems and in their relation to the sound record as well as in the mounting therefor whereby applicant produces a cheaper, more accurate and more efficient optical system which is more readily adjusted and maintained in adjustment than those in the prior art.

One object of this invention is to produce a relatively inexpensive and at the same time relatively rigid and accurate lens mount.

Another object of this invention is to provide an objective lens of sufficient accuracy and sufficiently large aperture at a minimum of expense.

Another object of this invention is to produce a cylindrical objective lens of relatively large aperture.

Another object of this invention is to provide a method of focusing an optical system with great facility and accuracy.

Another object of this invention is to provide a lens mount which will permit of the application of such method of focusing.

Another object of this invention is to provide a lens mount permitting easy interchangeability of lenses and allowing for variations in the size thereof within economical limits of commercial manufacturing tolerances.

Another object of this invention is to provide a lens mount wherein the lens may be accurately and quickly placed.

Another object of this invention is to provide without the inclusion of any additional or auxiliary parts the mask adjustment to the film and accurately defining the length of the linear light image thereon.

My invention and the objects thereof will be better understood from the following description when considered in connection with the accompanying drawing and its scope will be pointed out in the appended claims.

Figure 3:
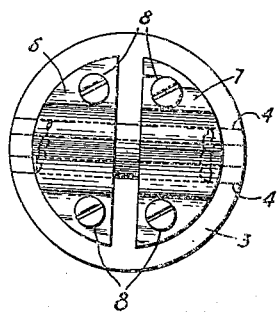

Figure 3 is an end view of the lens mount. My lens mount includes a tube 1 having at one end a solid end member 3 adapted to mount the cylindrical lens as hereinafter more fully described and adapted to carry at its other end, not shown, any of the usual forms of linear light source and condensing system or the equivalent thereof such as are standard commercial practice or such, for example, as is shown in Eldred Patent 1,655,811.

In the end 3 of the tube 1 is cut a recess indicated at 4—4 in the drawing and which is of a width approximately the same as the diameter of the lens 2 being no smaller than such diameter nor more than about 20 or 25% larger than such diameter, and this slot is, as shown, cut to a depth of a little over a half the diameter of the lens,—preferably about two-thirds of such diameter. Across the middle of the bottom of such recess, a further recess 5 is cut extending the remainder of the way through the end member 3 of the tube 1. It will be apparent that it is not necessary for either or both of such recesses to be cut entirely across the end of the tube as the recess 5 defines only the aperture of the lens while the recess 4 in conjunction with the edges of the recess 5 merely determines the position of such lens.

This recess 5 is made of a width of approximately one-third that of the recess 4—4 and may be within the same limits of tolerance although a slightly less tolerance is preferable.

As will be apparent from the drawing, the cylindrical lens 2, which may be merely a section of glass rod selected so as to be free from imperfections, lies in the recess 4 and against the edges of the recess 5 and is held in such position by the plates 6 and 7, which are preferably made of thin spring metal and held firmly against the end 3 of the tube 1 by screws 8.

It will be apparent that the use of such spring metal allows for considerable variation in the diameter of the lens and the cooperation of such spring members with the edges of the recess 5 provides for accurate alignment of the lens with the slot provided thereby.

This entire assembly may be mounted in any usual manner which will hold the recesses 4 and 5 in proper transverse alignment with the film 9 and permit the movement of the tube toward or away from such film, or the mount may be such as to permit even rotational movement of the tube, such lateral alignment being accomplished independently.

It will be apparent that the edges of the members 6 and 7 accurately define the longitudinal limits of the linear image impressed on the film as rather clearly shown in Fig. 3 and thereby serve the additional function of a masking means.

The reason I make the recess 5 approximately one-third the diameter of the cylindrical lens 2 is because I find that at this dimension the best mean between large relative aperture of the lens and accurate correction thereof is attained, and I preferably make this slot of a width of .04 inch while the rod is preferably of a diameter of .12 inch.

I further find that if the actual or virtual distance of the source from which this lens receives its light is great relative to the focal length of this cylindrical lens, a linear image will be formed at a distance corresponding to the focal length of the lens for an object at infinity distance, or at least at a sufficiently close approximation thereto to permit this cylindrical lens to be focused substantially for infinity without undue error.

I further find that this focal length measured from the axis of the lens is at a distance of three-fourths of the diameter of the lens or in other words at a distance from the surface of the lens of one-fourth of its diameter.

Figure 1:
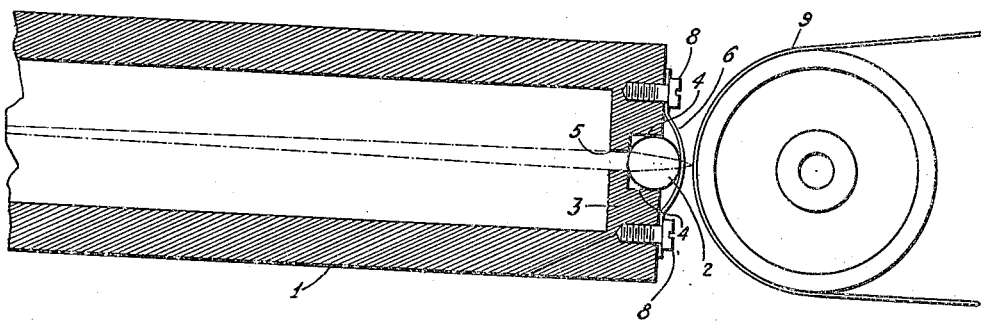
Figure 1 is a longitudinal section of my optical system showing the lens mounted therein and its relation to a film sound record.
Figure 2:
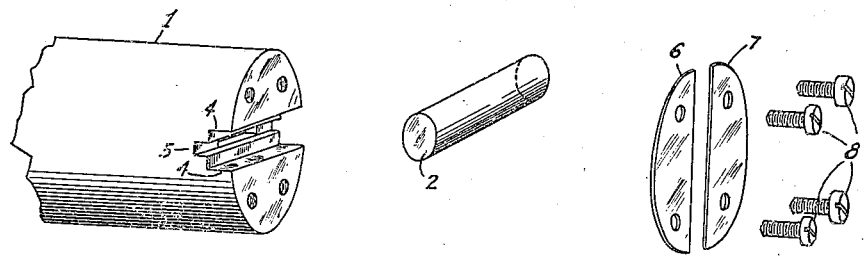
Figure 2 is an exploded view of the lens mount.

I accordingly have devised a new and simple means for accurately focusing this optical system to wit:

I locate the cylindrical lens at a distance of one-fourth of its diameter from the film or from record surface 9 by placing a feeler-gauge between such surfaces and moving the lens or film carrier until these two surfaces are in contact with the feeler-gauge. For example, with the lens referred to above, the distance thereof from the film will be .03 inch and by inserting a feeler-gauge of this thickness against the film in Fig. 1 and moving the tube forward until the surface of the lens 2 exposed between the plates 6 and 7 contacts with such feeler-gauge, the lens is accurately focused on the film.

The usual variations in diameter of the lens will produce a relatively smaller variation in the focal distance thereof but in case I desire to focus the lens with an extreme degree of accuracy I can determine the diameter of the particular lens to be focused by means of a micrometer or equivalent device and then choose a feeler-gauge having the total thickness amounting to one-fourth of the indicated diameter.

By the term "photophonographic" in the claims hereinafter included I refer to apparatus of that type which uses either a photographic method of recording or its equivalent or a photo-electric method of reproduction or its equivalent.

Having now described my invention, its operation and the method of adjustment thereof, I claim:

1. A lens system for photophonographic apparatus comprising an objective lens in the form of a complete cylinder and fixed means in cooperative relation therewith limiting the aperture thereof to one-third of the diameter of the lens.

2. A lens mount for a cylindrical lens comprising a rectangular recess adapted to receive said cylindrical lens and a spring pressure member attached to said mounting, for retaining the lens thereon and serving as a mask therefor.

3. A lens mount for a cylindrical lens comprising a rectangular recess adapted to receive said cylindrical lens and a plurality of spring pressure members attached to said mounting, for retaining the lens thereon and providing masks therefor.

JOHN A. MAURER, Jr.